Aug. 7, 1962

R. V. TATA 3,048,342

HIGH SPEED TRAVERSE MECHANISM

Filed April 25, 1960

INVENTOR.
RAYMOND V. TATA
BY
ATTORNEY

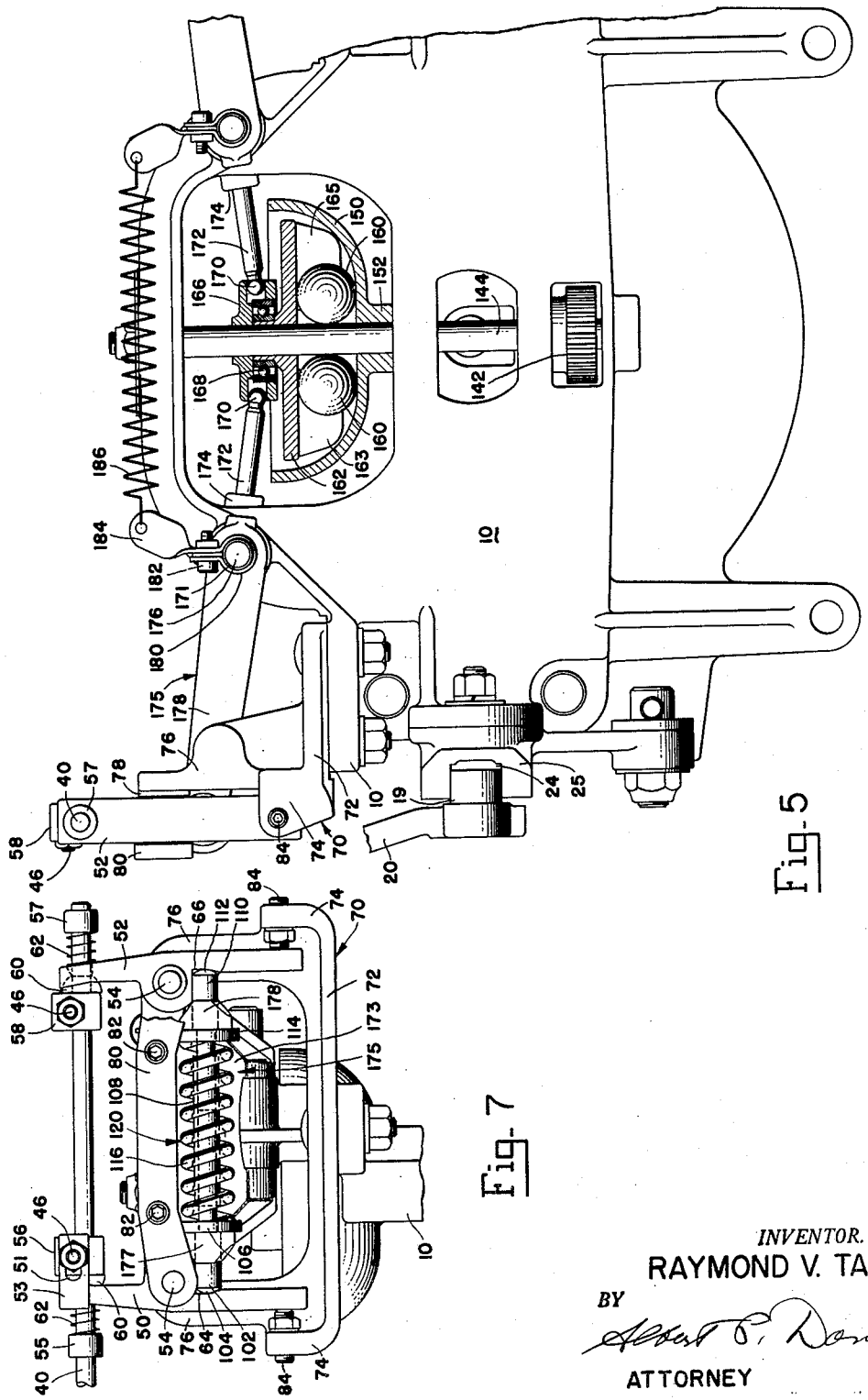

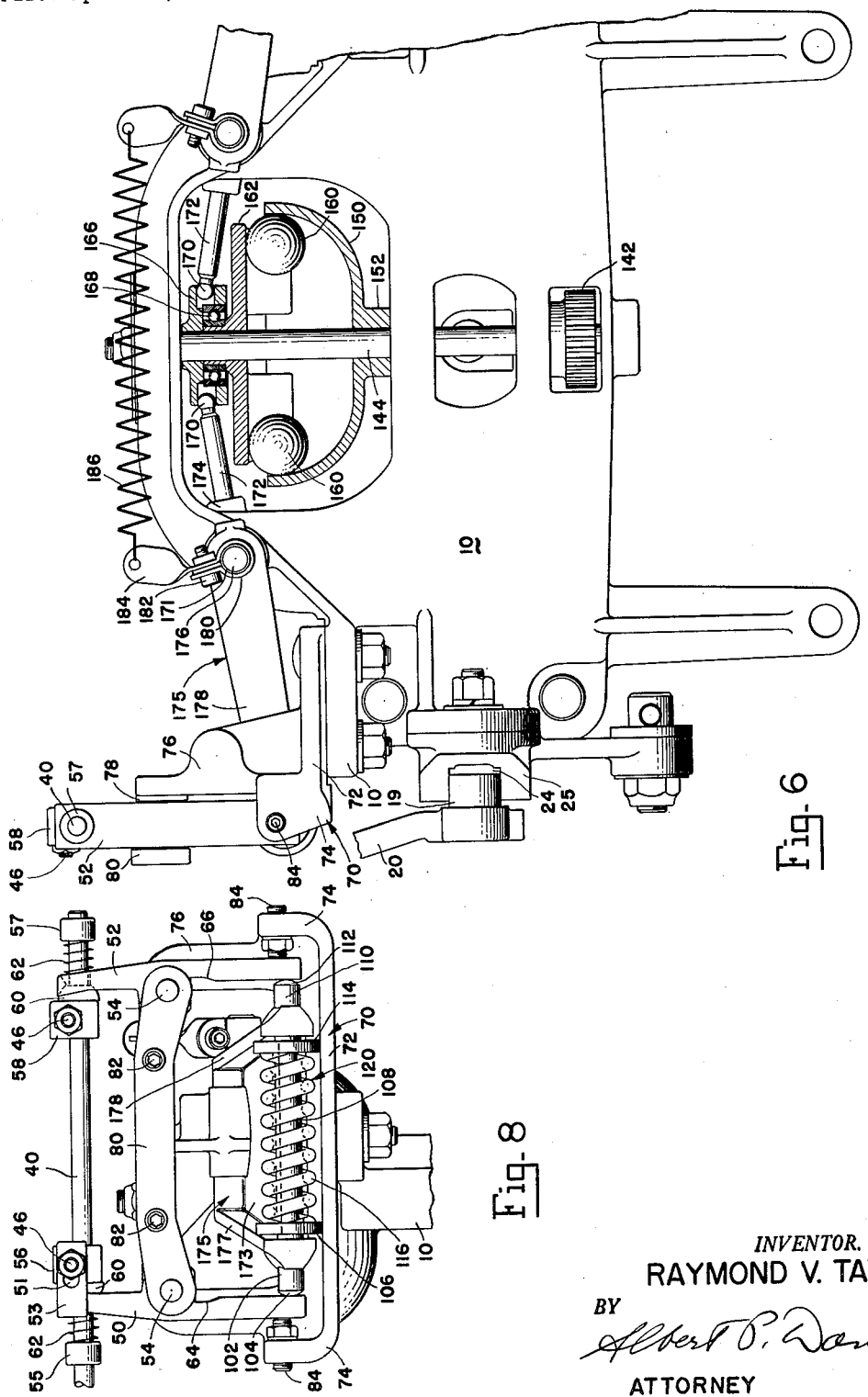

United States Patent Office 3,048,342
Patented Aug. 7, 1962

3,048,342
HIGH SPEED TRAVERSE MECHANISM
Raymond V. Tata, Warwick, R.I., assignor to Leesona Corporation, Cranston, R.I., a corporation of Massachusetts
Filed Apr. 25, 1960, Ser. No. 24,305
10 Claims. (Cl. 242—43)

The present invention relates to apparatus for winding yarn and more particularly to a traverse mechanism for traversing a winding strand of yarn at high speed.

Many textile machines, for example, uptwisters and redraw machines, simultaneously wind a plurality of strands of yarn into a plurality of separate yarn packages. This is accomplished by traversing the plurality of strands longitudinally of a plurality of spindles. Inasmuch as this is a gang type operation, the most economical apparatus comprises a single traverse cam which is adapted to reciprocate a long bar parallel to the surface of the winding spindles. A plurality of yarn guides, one adjacent each spindle, are fixed to the bar to guide the winding yarn onto the package.

It is becoming increasingly desirable to form the yarn thus wound in a self-supporting package. However, to accomplish this it is necessary that the winding strands be traversed rapidly with respect to the rotational speed of the winding package so that no more than four or five winds per layer are placed on the package. Furthermore, to form a proper self-supporting package it is necessary that the traverse of the winding strands be substantially constant until they reach one end of the winding packages when the traverse must be stopped, restarted in the opposite direction and returned to the constant traverse speed as instantaneously as possible. If the yarn traverse is not reversed rapidly enough the strand tends to dwell at the ends of said package causing yarn to build up more rapidly at said ends to form an uneven appearing package and which permits stitches to form easily.

Substantially instantaneous reversal of direction of the heavy reciprocating parts requires a large force, particularly if said parts are moving at high speed. Because of the large forces involved prior art traversing cams have been limited to a speed in the order of 50 revolutions per minute.

Through improved yarn processing techniques it is now possible to process yarn at greatly increased speeds. For example, modern uptwist spindles can be operated at speeds up to 15,000 revolutions per minute; multiple twist spindles are often used which have a twisting capacity equivalent to an uptwister spindle operating at 30,000 revolutions per minute; and false twist spindles capable of operating at speeds in excess of 250,000 revolutions per minute are now employed in the manufacture of stretch yarn. Obviously, the prior art traversing mechanisms are incapable of winding self supporting packages on machines employing such spindles.

It is therefore one object of the present invention to provide means for traversing a winding strand of yarn longitudinally of a winding package at a substantially constant high speed and reversing the direction of traverse substantially instantaneously at said ends of the package with minimal strain and wear on said traversing mechanism.

Another object of the present invention is to provide a high speed traverse mechanism wherein wear of the cam surface thereof is substantially reduced or eliminated.

Another object of the present invention is to provide a traversing mechanism for a winding machine which is capable of smooth operation at high and low speeds.

Another object of the present invention is to provide a high speed traverse mechanism which is inexpensive to manufacture and durable, economical and reliable in use.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings where:

FIG. 5 is an enlarged fragmentary view corresponding to FIG. 4;

FIG. 6 is a view corresponding to FIG. 5 but showing the mechanism in high speed position;

FIG. 7 is an enlarged side elevation of the buffer spring assembly; and

FIG. 8 is a view corresponding to FIG. 7 but showing the assembly in high speed position.

Figure 1:
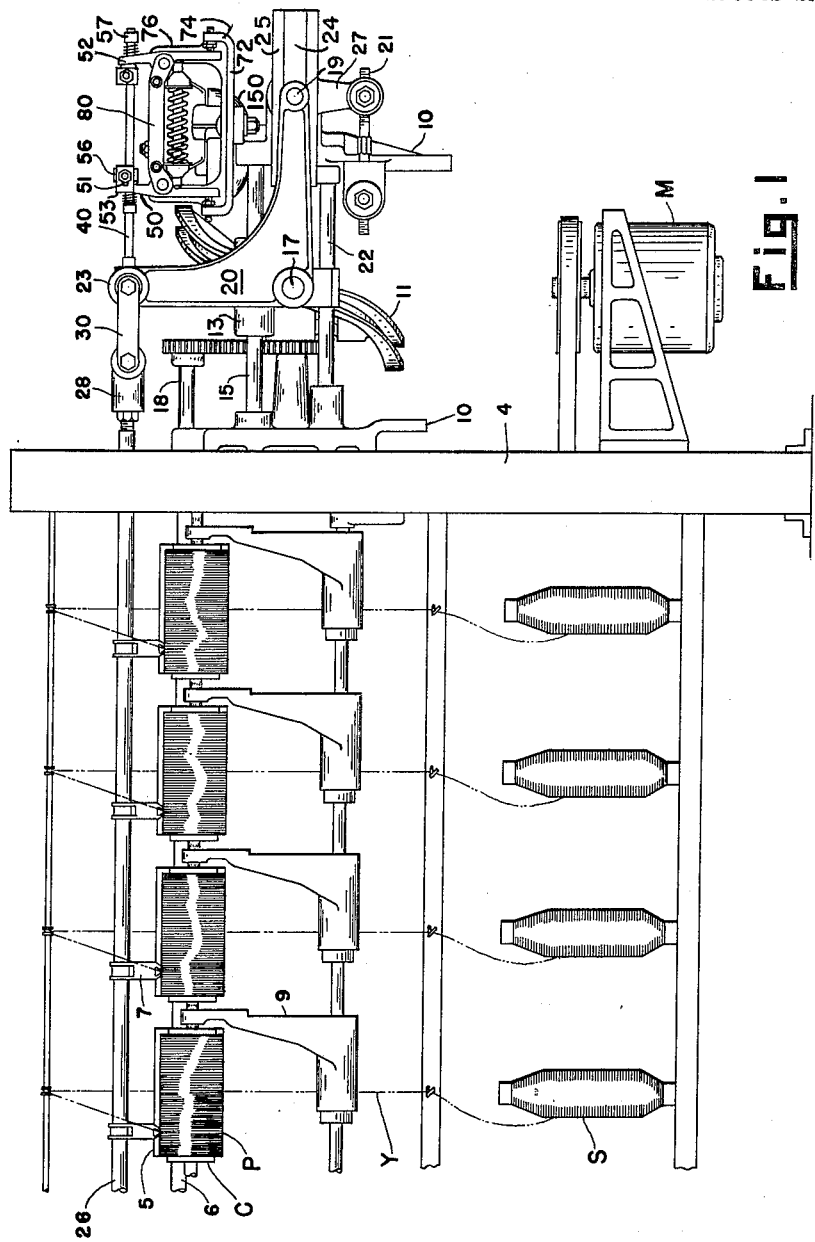
FIG. 1 is a front elevation of a portion of a winding machine incorporating the present invention.

The high speed traverse mechanism of the present invention is herein disclosed in connection with an uptwister.

The traverse mechanism comprises a resilient means as a buffer spring associated with each traverse rod and engageable therewith at each reversal of direction thereof to assist the traverse cam to decelerate, stop and accelerate the traverse rods in the opposite direction, together with means for varying the amount of assistance provided by said springs depending on traversing speed.

Referring now to the drawing wherein a preferred embodiment of the present invention is disclosed. The numeral 10 will be used generally to indicate the fixed frame of an uptwister of which the present traverse mechanism is a part. The winding units may be spaced along frame of an uptwister of which the present traverse mech- Power transmission means are enclosed in end housing 4 with power taken from a suitable source such as electric motor M. A series of drive rolls 5 are mounted fast on a horizontal shaft 6 that extends longitudinally of the gang machine and is driven continuously from the power transmission means in the end housing 4 with the rolls disposed in spaced relationship corresponding to the spacing of the winding spindles of the several units.

As herein illustrated, each winding unit is adapted to wind a package P rotated by surface contact with its respective drive roll 5. Each winding unit is provided with a yarn guide 7 fixed on a traversing rod 26 which extends horizontally along the length of the gang machine and is adapted for reciprocation longitudinally of frame 10. Rod 26 is driven continuously from motor M through means to be presently described in a manner such that each yarn guide 7 will be oscillated from end to end of package P. With a strand of yarn Y being withdrawn from its corresponding supply package S and being suitably directed through yarn guide 7 strand Y is traversed from end to end of package P in an old and well known manner to thereby wind a package. Each package P is wound on a core C which supports the yarn mass. The cores C, in turn, are suitably held for rotation each carried by spindle means on a pivoted arm 9 of usual construction adapted to pivot generally outwardly away from drive roll 5 during the building of a package on core C.

Rod 26 is reciprocated by the following means. A cam 11 is rotatably journaled on shaft 12 which is fixed horizontally in frame 10. Cam 11 is driven by a spur gear 14 which is fixed to cam 11 and which is operatively engaged by spur gear 16 mounted on power take-off shaft 18 driven by motor M.

A pair of cam followers 13 are disposed on opposite sides of and engaged in cam 11. Each follower 13 is slidably mounted on one of parallel fixed shafts 15 and 22 and is reciprocated therealong in response to rotation of cam 11. A pair of bell-crank levers 20 are disposed outwardly of cam 11 and are pivotally connected to their adjacent follower 13 by a stub shaft 17 for reciprocation thereby. The reciprocating and pivoting movement of lever 20 is determined by stub shaft 17 moving with follower 13 and roller 19 moving in sine slot 24. Slot 24 is formed in sine bar 25 which is pivotally mounted on frame 10 and is adjustable with respect to the horizontal by means of depending finger 27 fixed to bar 25 and threaded member 21 adapted to pivot said finger and bar. The rotation of cam 11 produces substantially horizontal reciprocation of stub shaft 17. Roller 19 reciprocating in slot 24 causes a slight rotation of lever 20 according to the setting of member 21 to thereby adjust the stroke of the upper end 23 of said lever.

The upper end 23 of lever 20 is bifurcated. A rotation preventing flat link 30 is connected to the outside of end lever 23 by headed stud 36 passing through a slotted hole in said link. Stud 36 is thread intermediate the flanges of end 23 to receive length adjusting screw 34. A second stud 32 similarly connects link 30 and screw 34 to clevis 28. Traverse rod 26 is threadedly connected to clevis 28 and is guided by frame 10 for reciprocating horizontal motion. The initial position of rod 26 can be adjusted by means of screw 34. Through the use of change gears on the power receiving end of shaft 18 various ratios of traverse speed to spindle speed are obtained.

All of the above described structure is old and well known in the art, and is presented here only for clarity, to show the relation of an embodiment of the present invention to a particular type of machine.

Figure 4:
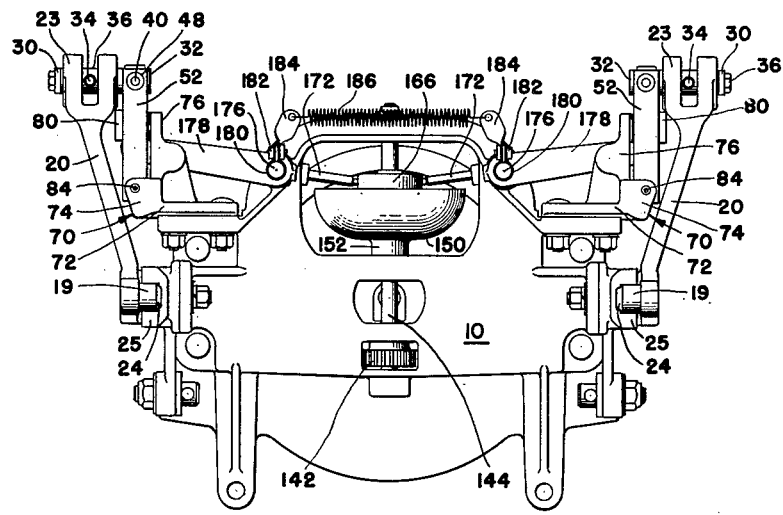
FIG. 4 is an end elevation of the traverse mechanism of FIG. 2.
Figure 3:
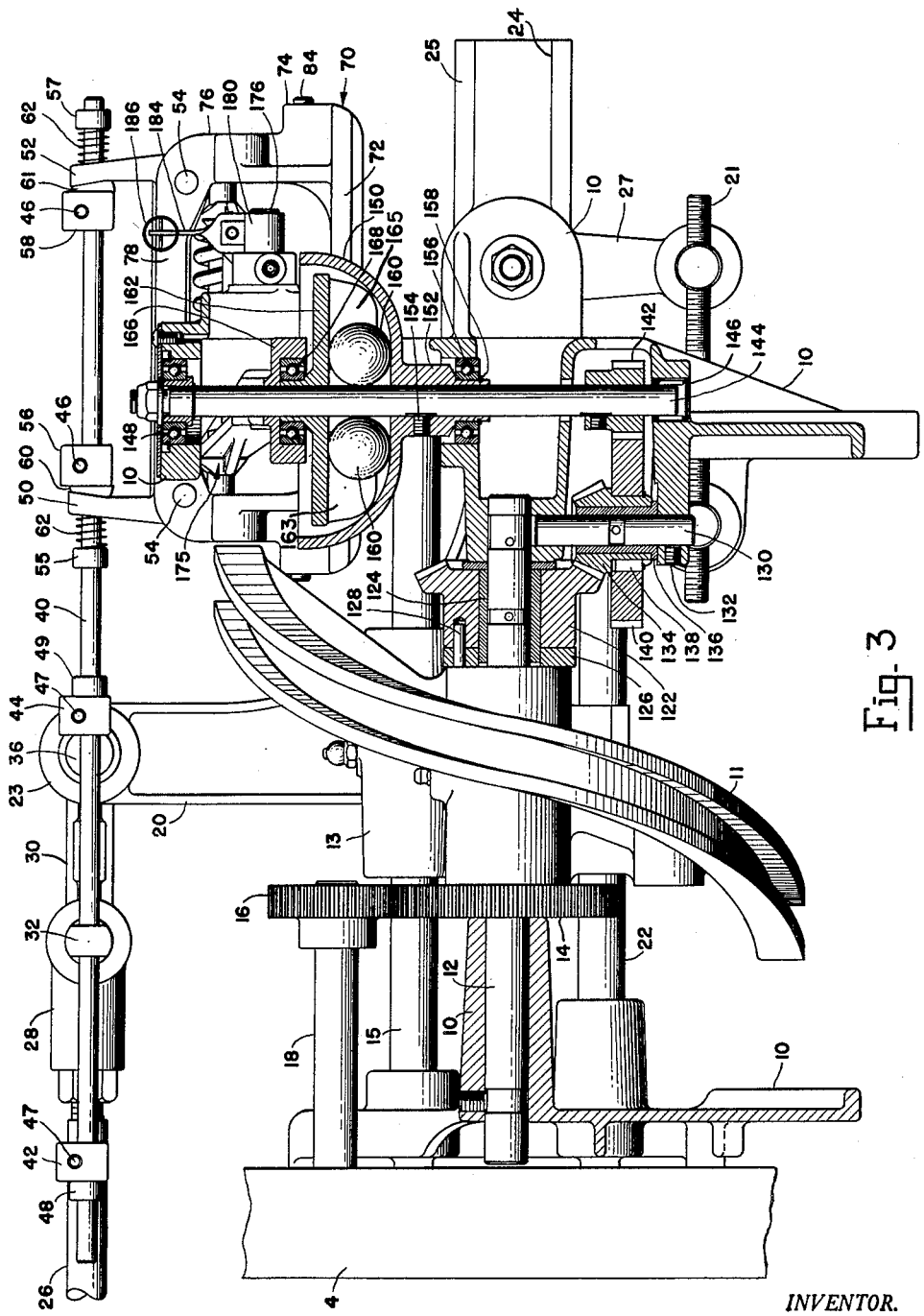
FIG. 3 is a view corresponding to FIG. 2 but partly in section and drawn to a larger scale.

The buffer mechanism of the present invention, which is normally duplicated on each side of the winding machine as indicated in the drawings, is comprised as follows: Stud 32 is extended inwardly past clevis 28 (see FIGS. 3 and 4) and said extension is provided with two flats substantially perpendicular to the axis of rod 26 and an opening parallel to rod 26. A horizontal rod 40 is slidably mounted in said opening in stud 32. A pair of abutments 42 and 44 (see FIG. 3), disposed on opposite sides of and spaced from stud 32, are fixed to rod 40 by bolts 47. A collar 48 is positioned adjacent abutment 42 on the side opposite stud 32, and fixed to rod 40 by a set screw (not shown). A second collar 49 is similarly disposed with respect to abutment 44.

Figure 2:
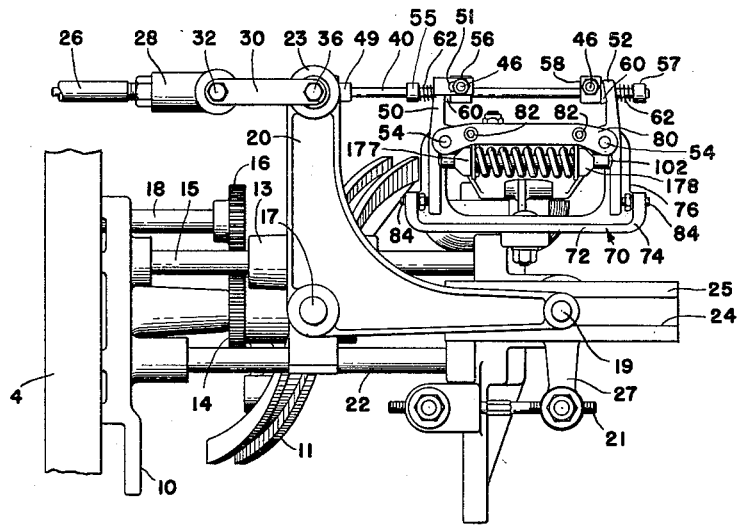
FIG. 2 is a side elevation of a preferred embodiment of the high speed traverse mechanism of the present invention.

Levers 50 and 52 (see FIG. 2 et seq.) are mounted on fixed pins 54, carried by a unitary bracket 70, to be described more fully presently, for pivotal movement thereabout in a plane passing through rod 40. Bracket 70 is fixed to frame 10. The upper ends of levers 50 and 52 have openings passing therethrough in which rod 40 is slidably mounted (best shown in FIG. 3). An abutment 56 is fixed to rod 40 by bolt 46 and disposed intermediate levers 50 and 52 and adjacent lever 50. Intermediate lever 50 and abutment 56 is a hemispherical washer 60 having the plane face thereof adjacent said abutment and the convex spherical surface thereof adjacent a cooperating concave spherical surface of said lever. An abutment 58 and a second hemispherical washer 61 are similarly disposed adjacent lever 52. A flat plate 53 is fastened to abutment 56 by means of bolt 46 passing through a slot 51 in said plate (see FIGS. 1 and 7). Plate 53 bears slidably against lever 50 to prevent rotation of rod 40.

A collar 55 is fixed to rod 40 by a set screw (not shown) adjacent lever 50 opposite abutment 56. Spring 62 is coiled about rod 40 and compressed between collar 55 and lever 50 to bias said lever against washer 60 and said washer against abutment 56. A second spring 62 and collar 57 are similarly disposed adjacent lever 52.

Bracket 70 is bolted to frame 10 below rod 40 and comprises a flat horizontal plate portion 72 with two angular upstanding members 76 (see FIG. 4) adjacent the upturned outer corners 74. The upper ends of members 76 are connected by a bar portion 78 (see FIG. 3). A bar 80 of substantially the same shape as portion 78 is connected to portion 78 by screws 82 (see FIG. 2). Said bar 80 and portion 78 are positioned on opposite sides of and adjacent levers 50 and 52. Pivot pins 54 passing through levers 50 and 52 are fixedly mounted in said ends of bar 80 and portion 78. Adjusting screws 84 are threadedly mounted in corners 74 so as to bear against the lower arms of levers 50 and 52.

The buffer spring assembly 120 (see FIG. 7) comprises rods 102 and 110, plates 106 and 114, tube 108 and spring 116. Rod 102 has a substantially cylindrical portion with a rounded end 104 abutting lever 50 beneath pin 54, and a second cylindrical portion of smaller diameter than the first extending through a circular retainer plate 106 and terminating within tube 108. Rod 110 is similar having end 112 abutting lever 52 and a portion of reduced diameter extending through retainer plate 114 and terminating within tube 108 in spaced relation with the end of rod 102. The ends of tube 108 are normally in spaced relation with retainer plates 106 and 114. Buffer spring 116, coiled around tube 108, is compressed between plates 106 and 114. As indicated in the drawings the above described mechanism is repeated for both sides of the machines.

Buffer spring assemblies 120 are movable into an inoperative position (shown in FIG. 7) wherein rod ends 104 and 112 abut the slight depressions 64 and 66 below pins 54 in levers 50 and 52 respectively, or into an operative position wherein said rod ends abut some portion of the lower ends of said levers below said depressions. Such movement is accomplished by means of a centrifugal position governor to be next described with particular reference to FIG. 3.

Bevel gear 122 is rotatably mounted on fixed shaft 12 by means of bushing 124. The hub of gear 122 abuts spacer 126 which in turn abuts the hub of cam 11. Spacer 126 and gear 122 are fixed to cam 11 for rotation therewith by pin 128. Bevel gear 134 is rotatably mounted on shaft 130 by means of bushing 136 and said shaft is fixed to frame 10 by set screw 132 so that gear 134 is positioned to cooperatively engage with gear 122. Bushing 136 is provided with a flange for transmitting the thrust resulting from said cooperative engagement to frame 10. Spur gear 140 is rotatably mounted on shaft 130 adjacent the hub of gear 134 and is keyed to gear 134 for rotation therewith, by key 138. Spur gear 142, fixed to governor shaft 144, is positioned to cooperatively engage gear 140 to thereby rotate shaft 144 in response to rotation of shaft 12. Governor shaft 144 is rotatably journaled in anti-friction bearings 146 and 148 which are fixed in frame 10 adjacent the ends of said shaft. Intermediate bearings 146 and 148 a bowl shaped governor cup 150 having a downwardly extending axial hub 152 is fixed to shaft 144 by means of set screw 154. The lower end of hub 152 is journaled in frame 10 by means of anti-friction bearing 156. Bearing 156 is fixed between retaining ring 158 engaged in a suitable groove in hub 152, and a cooperating shoulder on said hub.

Cover 162 is substantially flat on top, and conforms below generally to the inner shape of cup 150. Cover 162 has two radially extending depending walls 163 and 165 formed in the bottom thereof through the intersection of which passes shaft 144 dividing said walls into four radial compartments each of which is provided with a governor ball 160. Cover 162 is keyed to but axially slidable on shaft 144 to rotate therewith. Slider 166 is mounted for axial movement on shaft 144 above cover 162 but prevented from rotating about said shaft by means to be more fully described hereinafter. An axial hub on the top of cover 162 extends upwardly into slider 166 and is rotatably journaled therein by anti-friction bearing 168.

Two diametrically opposite cylindrical openings in the periphery of slider 166 are engaged by the spherical ends 170 of rods 172 (see FIG. 5) each of which is connected to a spring assembly carrier 175 as follows. Each carrier 175 has a relatively large plate-like cross web 173 (see FIG. 7), and legs 177 and 178. A bore 171 passes through the ends of legs 177 and 178 nearest slider 166 and substantially parallel to web 173. A shaft 176 is fixed in bore 171 and rotatably journaled in frame 10 intermediate legs 177 and 178 to thereby pivotally mount carrier 175. Leg 177 has a projection 174 which extends past shaft 176 towards slider 166 and has a bore therein perpendicular to said shaft. Rod 172 is fixed within the bore of projection 174 to form an extension of said projection connecting carrier 175 to slider 166.

A bore parallel to bore 171 passes through the opposite ends of legs 177 and 178, that is outwardly of web 173, within which are slidably mounted rods 102 and 110 so that buffer spring assembly 120 is carried between said legs.

Shaft 176 extends past leg 178 and is provided with a band 180 passing therearound adjacent said leg and clamped fixedly to said shaft by bolt 182. An upstanding tab 184 of band 180 is adapted to retain an end of spring 186. Said spring is extended between the pair of tabs 184 disposed on opposite sides of governor cup 150.

The high speed traverse motion of the present invention operates in the following manner. As the machine is started and while it is operating at low speeds buffer springs 116 are not needed to assist cam 11 in reversing the direction of motion of traverse bars 26. Because of the requisite stiffness thereof, springs 116 would actually impose inordinate loads on cam 11 at traverse speeds below some critical value. Below this critical speed buffer spring assemblies 120 are maintained in the inoperative position by the action of spring 186 biasing shafts 176 so as to maintain carrier 175 in an upward position and said buffer spring assemblies inoperative as best shown in FIGS. 5 and 7.

As the speed of cam 11 increases to thereby increase the speed of traverse bar 26 and the consequent decelerations and accelerations required to reverse the direction of motion thereof, the gear train comprising gears 122, 134, 140 and 142 rotates shaft 144 at an increasing speed. The centrifugal force exerted on balls 160 increases with increasing speed of shaft 144, urging said balls more strongly radially outward in their respective compartments.

The bowl shape of cup 150 provides a camming surface requiring balls 160 to move upward as they move outward. Opposing such upward movement is the combined weight of balls 160, cover 162 and slider 166, in addition to the force exerted on slider 166 by spring 186. However, as the speed of shaft 144 increases the centrifugal force acting on balls 160 becomes large enough to overcome the aforesaid opposing forces and said balls begin to move outward and upward, moving cover 162 and slider 166 upwards. Slider 166 moves ends 170 of rods 172 upwards pivoting said rods and projection 174 about shaft 176 to thereby rotate said shaft about the axis thereof and increase the force exerted by spring 186 to achieve a new equilibrium position. Each carrier 175 is pivoted downward about shaft 176 and carries the buffer spring assembly 120 out of depressions 64 and 66 and into an operative position in engagement with the lower portions of levers 50 and 52.

With buffer spring assemblies 120 in an operative position, assistance is given cam 11 for decelerating and accelerating each traverse bar 26, in the following manner. As traverse bar 26 moves to the right as viewed in FIGS. 1, 2 and 3, stud 32 slides axially along rod 40 until, near the end of the rightward motion, said stud engages abutment 44 and moves rod 40 to the right with traverse bar 26. Abutment 58 in engagement with lever 52 pivots said lever about pin 54 in response to said rightward movement of rod 40. Said pivotal movement of lever 52 causes the lower portion of said lever to move rod 110 and plate 114 to the left in FIG. 8 against buffer spring 116.

Whereas formerly the compressive force of buffer spring 116 was transmitted to bracket 70 through screws 84 said force is now transmitted through lever 52, abutment 58, rod 40 and abutment 44 to the traversing parts of the machine and acts to resist the rightward motion thereof. Thus, buffer spring 116 assists in decelerating and stopping said motion and as said traversing parts reverse direction assists in the acceleration thereof.

As bar 26 and rod 40 move to the left spring 116 is permitted to extend so that the force exerted thereby is continually diminished until lever 52 contacts screw 84 so that said spring is again retained by bracket 70. At this point stud 32 moves out of contact with abutment 44 and bar 26 continues to move to the left while rod 40 remains stationary.

Near the end of the leftward motion stud 32 engages abutment 42 and moves rod 40 to the left with bar 26. Abutment 56 in engagement with lever 50 pivots said lever about pin 54 in response to said leftward movement of rod 40. Said pivotal movement of lever 50 causes the lower portion of said lever to move rod 102 and plate 106 to the right increasing the compression in buffer spring 116. The compressive force of spring 116 is now transmitted through lever 50, abutment 56, rod 40 and abutment 42 to the traversing parts of the machine and acts to resist the leftward motion thereof.

Thus, buffer spring 116 assists in decelerating and stopping said leftward motion and as said traversing parts reverse direction assists in the acceleration thereof. As bar 26 and rod 40 move to the right spring 116 is permitted to extend so that the force exerted thereby is continually diminished until lever 50 contacts screw 84 so that said spring is again retained by bracket 70. At this point stud 32 moves to the right along rod 40 out of contact with abutment 42 and bar 26 continues to move to the right while rod 40 remains stationary and the cycle repeats.

As the speed of shaft 144 further increases balls 160 move further upwards moving buffer spring assemblies 120 closer the ends of levers 50 and 52 thus increasing the compression stroke of springs 116, the decelerating and accelerating force exerted thereby and the lever arm at which said force acts. In this manner the buffing effect is increased with speed until slider 166 abuts frame 10 restraining cover 162 from further upward movement. At this point each spring assembly 120 is adjacent the lower ends of levers 50 and 52, as shown in FIGS. 6 and 8. In this position spring 116 has its maximum compression stroke, develops its maximum accelerating and decelerating force and acts at its maximum lever arm.

Since certain changes may be made in the above apparatus without departing from the scope of the invention herein involved, it is intended that all matter contained in the above description or shown in the accompanying drawings shall be interpreted as illustrative and not in a limiting sense.

I claim:

1. In a winding machine having means for rotatably supporting a package core to wind yarn thereon, means for rotating said core, a traverse bar reciprocable longitudinally of the axis of said core, yarn guide means movable by said traverse bar for distributing yarn on said core, mechanical means for reciprocating said traverse bar, resilient means stressed by the movement of said bar near each end of each stroke thereof to assist said reciprocating means in decelerating said bar and imparting initial acceleration thereto in the opposite direction and means for varying in response to changes in the speed of the traverse bar the extent to which said resilient means is stressed whereby the assistance afforded by said resilient means varies in accordance with the speed of reciprocation of the traverse bar.

2. A winding machine as in claim 1 wherein said resilient means is a compression spring.

3. In a winding machine having means for rotatably supporting a package core to wind yarn thereon, means for rotating said core, a traverse bar reciprocable longitudinally of the axis of said core, yarn guide means movable by said traverse bar for distributing yarn on said core, a rotatable cam for reciprocating said traverse bar, lever means mounted for pivotal movement, means movable with said traverse bar to pivot said lever means near each end of each stroke of said bar, resilient means engaged by said lever means and stressed thereby upon pivotal movement thereof, and means for moving said resilient means along said lever means relative to the pivotal axis thereof to vary the extent to which the resilient means is stressed by said lever means, whereby said resilient means is operative cooperatively with said cam near the end of each stroke of the traverse bar to thereby impart a variable force to decelerate said traverse bar and impart initial acceleration thereto in the opposite direction.

4. A winding machine as in claim 3 wherein said lever means includes a lever arm engaging said resilient means and said resilient means is movable progressively to and from a substantially inoperative position adjacent the pivotal axis of said lever arm from and to a maximum operative position adjacent the end of the lever arm remote from said axis.

5. A winding machine as in claim 4 wherein said lever arm is provided with a recess adjacent its pivotal axis and said means for moving the resilient means includes a spring biased projection engageable with said recess when said resilient means is in substantially inoperative position.

6. In a winding machine having means for rotatably supporting a package core to wind yarn thereon, means for rotating said core, a traverse bar reciprocable longitudinally the axis of said core, yarn guide means movable by said traverse bar for distributing yarn on said core, a rotatable cam for reciprocating said traverse bar, lever means mounted for pivotal movement, means movable with said traverse bar to pivot said lever means near each end of each stroke of said bar, resilient means engaged by said lever means and stressed thereby upon pivotal movement thereof, and means for moving said resilient means along said lever means relative to the pivotal axis thereof to vary in response to changes in the speed of said traverse bar the extent to which the resilient means is stressed by said lever means, whereby said resilient means is operative cooperatively with said cam near the end of each stroke of the traverse bar to impart a variable force to decelerate said traverse bar and impart initial acceleration thereto in the opposite direction.

7. In a winding machine having means for rotatably supporting a package core to wind yarn thereon, means for rotating said core, a traverse bar reciprocable longitudinally the axis of said core, yarn guide means movable by said traverse bar for distributing yarn on said core, a rotatable cam for reciprocating said traverse bar, lever means mounted for pivotal movement, means movable with said traverse bar to pivot said lever means near each end of each stroke of said bar, resilient spring means engaged by said lever means and stressed thereby upon pivotal movement thereof, and means for moving said resilient spring means along said lever means relative to the pivotal axis thereof to vary in response to changes in the speed of the traverse bar the extent to which the resilient means is stressed by said lever means, whereby said resilient spring means is operative cooperatively with said cam near the end of each stroke of the traverse bar to impart a variable force to decelerate said traverse bar and impart initial acceleration thereto in the opposite direction.

8. In a winding machine having means for rotatably supporting a package core to wind yarn thereon, means for rotating said core, a traverse bar reciprocable longitudinally the axis of said core, yarn guide means movable by said traverse bar for distributing yarn on said core, a rotatable cam for reciprocating said traverse bar, lever means mounted for pivotal movement, means movable with said traverse bar to pivot said lever means near each end of each stroke of said bar, resilient means engaged by said lever means and stressed thereby upon pivotal movement thereof, a speed responsive device including a slidable element displaced in accordance with the speed of reciprocation of said traverse bar, and means for moving said resilient means along said lever means relative to the pivotal axis thereof to vary the extent to which said resilient means is stressed by said lever means, said last-named means being movable in response to displacement of said slidable element, whereby said resilient means is operative cooperatively with said cam near the end of each stroke of the traverse bar to decelerate said bar and impart initial acceleration thereto in the opposite direction.

9. A winding machine as in claim 8 wherein said speed responsive device comprises a cup member having an inclined surface, a plurality of elements disposed within said cup member in contact with said surface, and means for rotating said elements to move the same upon said inclined surface in response to the speed of rotation thereof, said slidable element being engaged by said last mentioned elements and displaced in accordance with the movement thereof.

10. A winding machine as in claim 9 wherein said means for rotating said elements within said cup member is driven by said traverse bar reciprocating means synchronously with the speed of reciprocation of the traverse bar and said slidable element is progressively displaced in accordance with the movement of said elements relative to said inclined surface.

References Cited in the file of this patent

UNITED STATES PATENTS

| | | |
|---|---|---|
| 1,974,482 | Bochmann | Sept. 25, 1934 |
| 2,301,699 | Helland | Nov. 10, 1942 |
| 2,388,557 | Little et al. | Nov. 6, 1945 |
| 2,713,980 | Roberts et al. | July 26, 1955 |
| 2,869,797 | Clerc | Jan. 20, 1959 |